United States Patent
Rege et al.

(10) Patent No.: US 11,166,584 B2
(45) Date of Patent: Nov. 9, 2021

(54) PRESSURIZED BREWING, GAS-INFUSION, AND DISPENSING MACHINE

(71) Applicant: GrowlerWerks, Inc., Portland, OR (US)

(72) Inventors: Evan C. Rege, Portland, OR (US); Brian E. Sonnichsen, Portland, OR (US); Shawn L. Huff, Portland, OR (US)

(73) Assignee: GROWLERWERKS, INC., Portland, OR (US)

( * ) Notice: Subject to any disclaimer, the term of this patent is extended or adjusted under 35 U.S.C. 154(b) by 0 days.

(21) Appl. No.: 16/831,709

(22) Filed: Mar. 26, 2020

(65) Prior Publication Data
US 2020/0305631 A1    Oct. 1, 2020

Related U.S. Application Data

(63) Continuation-in-part of application No. 16/449,128, filed on Jun. 21, 2019, now Pat. No. 10,870,568.
(Continued)

(51) Int. Cl.
*A47J 31/00*    (2006.01)
*A47J 31/06*    (2006.01)
(Continued)

(52) U.S. Cl.
CPC ......... *A47J 31/002* (2013.01); *A47J 31/0605* (2013.01); *A47J 31/0657* (2013.01);
(Continued)

(58) Field of Classification Search
CPC .... A47J 31/0657; A47J 31/002; A47J 31/065; A47J 31/446; A47J 31/461; A47J 31/4457; A47J 31/4407; A47J 31/0663; A47J 31/0689; A47J 2203/00; B01F 3/04801; B01F 2003/04921; B01F 15/00512; B67D 1/1466; B67D 1/1252; B67D 1/0418; B67D 1/0804; B67D 2001/0824; B67D 1/125; B67D 1/0871; B67D 1/1422
(Continued)

(56) References Cited

U.S. PATENT DOCUMENTS 2,143,655 A * 1/1939 Heller ................. B67D 1/1466
                                                                    210/429
3,084,718 A * 4/1963 Ash ..................... B67D 1/1466
                                                                    138/40
(Continued)

FOREIGN PATENT DOCUMENTS

GB          2411219 A  *  8/2005
WO      WO 2018/136689 A1 *  7/2018

*Primary Examiner* — Lien M Ngo
(74) *Attorney, Agent, or Firm* — Miller Nash LLP

(57) ABSTRACT

An integrated device including a vessel, a gas reservoir, a pressure regulation device, a primary filter, and a tap assembly. The vessel is configured to contain a beverage. The gas reservoir is configured to supply pressurized gas within the vessel. The pressure regulation device is configured to maintain an infusing pressure within the vessel and also a dispensing pressure within the vessel. The primary filter is configured to hold solid brewing media, to fit inside the vessel, and to be removable from the vessel. The tap assembly is configured to dispense the beverage from the vessel. Methods are also disclosed.

11 Claims, 10 Drawing Sheets

Related U.S. Application Data

(60) Provisional application No. 62/826,665, filed on Mar. 29, 2019.

(51) Int. Cl.
*A47J 31/44* (2006.01)
*B01F 3/04* (2006.01)
*A47J 31/46* (2006.01)

(52) U.S. Cl.
CPC ......... *A47J 31/446* (2013.01); *A47J 31/4407* (2013.01); *A47J 31/4457* (2013.01); *A47J 31/461* (2018.08); *B01F 3/04801* (2013.01); *A47J 2203/00* (2013.01); *B01F 2003/04921* (2013.01); *B01F 2215/0022* (2013.01)

(58) Field of Classification Search
USPC ............................... 222/399, 396, 397, 400.7
See application file for complete search history.

(56) References Cited

U.S. PATENT DOCUMENTS

| | | | |
|---|---|---|---|
| 4,166,606 A * | 9/1979 | Kawolics | F16K 41/04 251/214 |
| 6,082,589 A * | 7/2000 | Ash | B67D 1/04 222/146.6 |
| 2010/0181336 A1* | 7/2010 | Rasmussen | B67D 1/1416 222/1 |
| 2014/0076173 A1* | 3/2014 | Pellaud | B65B 51/04 99/323.2 |
| 2014/0227398 A1* | 8/2014 | Koskinen | B65B 29/028 426/83 |
| 2015/0336785 A1* | 11/2015 | Rege | B67D 1/1477 222/1 |
| 2016/0068380 A1* | 3/2016 | Rege | B67D 1/1252 222/23 |
| 2016/0318665 A1* | 11/2016 | Springer | B65D 29/00 |
| 2019/0389714 A1 | 12/2019 | Sonnichsen et al. | |

* cited by examiner

PRESSURIZED BREWING, GAS-INFUSION, AND DISPENSING MACHINE

CROSS-REFERENCES TO RELATED APPLICATIONS

This patent application is a continuation-in-part of application Ser. No. 16/449,128 filed Jun. 21, 2019. This application also claims the benefit of provisional Application No. 62/826,665, filed on Mar. 29, 2019. Application Ser. Nos. 16/449,128 and 62/826,665 are each incorporated into the present disclosure by this reference.

TECHNICAL FIELD

The disclosed embodiments are related to a cold-brewing device, and, more particularly, to a device that brews or stores cold-brew beverages in such a way that the beverage is infused with a gas at above the ambient pressure.

BACKGROUND

"Nitro" cold-brew coffee, that is coffee that has been infused with a high pressure gas (generally nitrogen or nitrous oxide), has traditionally only been available at commercial serving locations because the process requires modified kegging equipment only available at scales larger than what is appropriate for home use. The equipment is such that the brewing is done in a container that is open to the ambient atmosphere. The brewed coffee is then transferred to a pressure vessel (generally a beer or soda keg) and put under gas pressure to infuse the beverage with dissolved gas. The dissolved gas gives the beverage an enhanced flavor and mouth feel that improves the taste of the beverage, mouth feel and the drinking experience. The pressurized keg is then connected to a serving system that meters the pressurized beverage to control the flow rate while creating the conditions to bring the dissolved gas out of solution, creating a controlled effervescence in the glass. In commercial set ups, the steps of brewing coffee and adding dissolved gas are separate. These two separate steps each contribute time to the total time it takes to create the final "gasified" cold brew.

The current cold-brew equipment is commercial kegging and pressurized gas equipment. The parts are all separate and must be connected together. They include several different types of fittings, valves, regulators, compressed gas containers, hoses and tubing. Thus, the user would need to have knowledge of how to connect these components. Before that, the user would need to acquire knowledge of what pieces of equipment they needed to acquire. The cost of these commercial components alone may be prohibitive to many consumers. Furthermore, the current equipment is cumbersome and not portable. Accordingly, consumers must transport the beverage with dissolved gas to the location where it would be consumed. Exposure to oxygen and atmospheric pressure can degrade the beverage during transport and exposure, and could also risk spillage, and introduces an undesirable inconvenience.

Cold-brew coffee is typically served at a cold temperature. Guidelines recommend temperatures in the range of standard refrigerated beverages. An increase of temperature is undesirable for cold-brew beverages because it degrades the attractiveness of the beverage being consumed at a cold temperature. Increasing temperature also reduces the amount of dissolved gas that can be retained in the beverage. Increased temperature increases the vapor pressure of the dissolved gas and thus causes it to vaporize and be released from the liquid solution, thus leaving behind a flat beverage. For example, the remaining cold-brew coffee after the dissolved gas leaves is simply regular flat cold-brew coffee.

The amount of the dissolved gas creates the desired mouth feel and also crema or foam layer on top of the beverage after pouring. Too much gas is undesirable because that could create an overly effervescent mouth feel. Too much dissolved gas could also create too much foam when pouring and serving the cold-brew coffee. Likewise, too little dissolved gas would not adequately gasify the cold-brew beverage. For example, if not enough gas is dissolved in a coffee beverage, the beverage would simply be flat, cold-brew coffee.

There are several cold-brew coffee brewing devices available for the home. These are generally scaled down versions of the commercial system and made of glass, plastic, or metal. These devices are open to the ambient atmosphere and do not include any mechanism for pressurizing with a gas, i.e. they brew flat cold-brew coffee that does not contain any pressurized gas. The currently available devices also have no way of serving the pressurized beverage in a controllable manner.

Embodiments of the disclosed technology address shortcomings in the prior art.

DETAILED DESCRIPTION

As described herein, embodiments are directed to a pressurized brewing, gas-infusion, and dispensing device that allows a user to brew cold-brew beverages (such as coffee), pressurize and dissolve high-pressure gas into the beverage simultaneously, and serve the resulting beverage in a manner that creates a controlled effervescence in the user's glass. Although these embodiments are described with reference to the gasified liquid being coffee or tea, embodiments of the invention are structured to work with any liquid beverage. The device described is particularly designed and sized for home use. Alternatively, embodiments of the invention may brew a beverage in a first step then, a second step, add the finished cold-brewed beverage to the device to add gas and allow for immediate serving of the gasified cold-brewed beverage.

Figure 1:
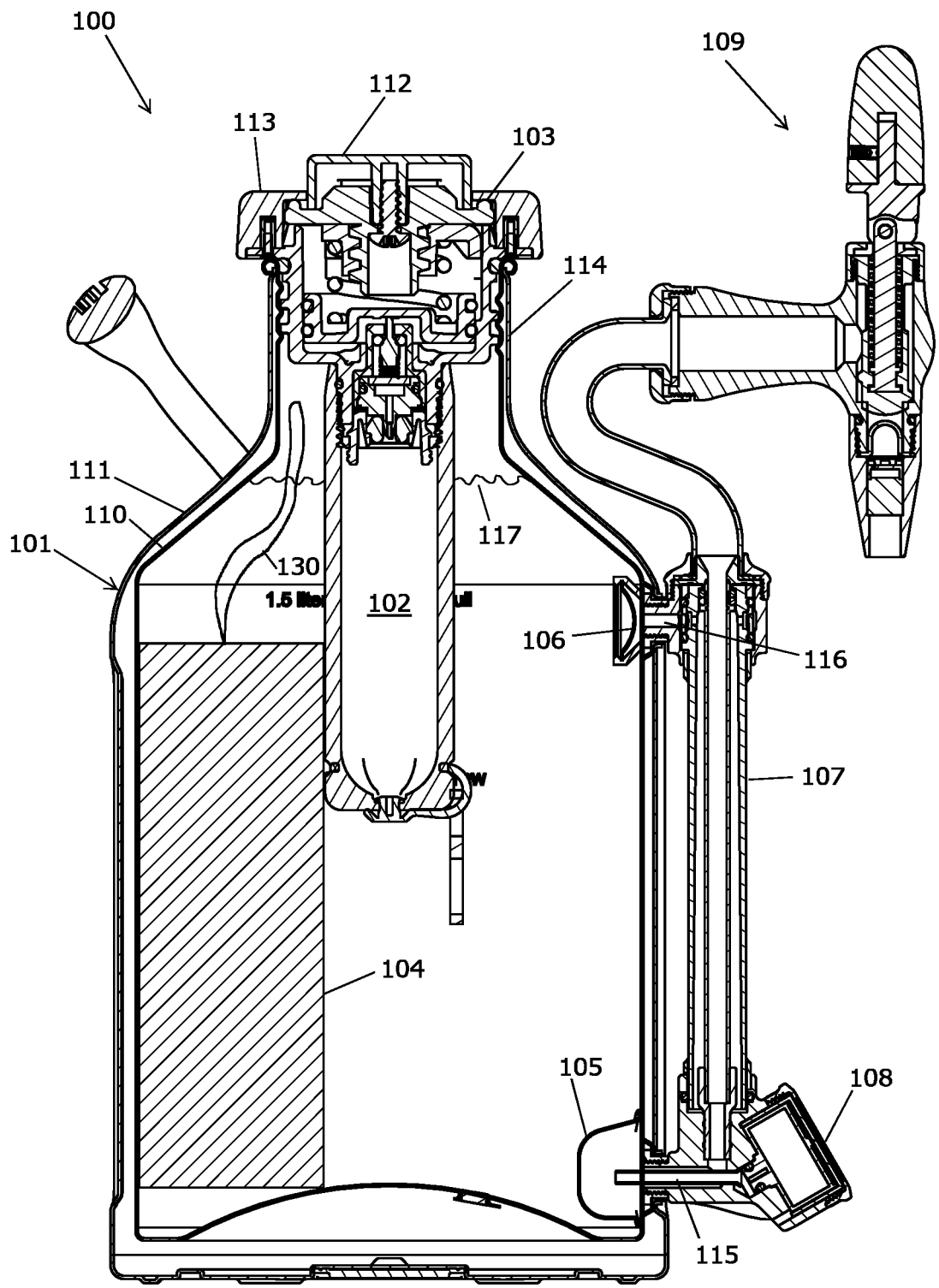
FIG. 1 is a front-side, cross sectional view of a pressurized brewing, gas-infusion, and dispensing device, according to embodiments.

FIG. 1 is a front-side, cross sectional view showing portions of a pressurized brewing, gas-infusion, and dispensing device 100, according to embodiments. As illustrated in FIG. 1, a pressurized brewing, gas-infusion, and dispensing device 100 may include a vessel 101, a gas reservoir 102, a pressure regulation device 103, a primary filter 104, a first secondary filter 105, a second secondary filter 106, a visual level gauge 107, a pressure indicator 108, and a tap assembly 109.

As illustrated, the vessel 101 includes an inner wall 110 and an outer wall 111. The vessel 101 may be configured to contain an above-ambient pressure necessary for gas infusion. In the embodiment pictured, the vessel 101 may be thermally insulated. The vessel 101 may be insulated by, for example, a vacuum maintained between the inner wall 110 and the outer wall 111. This insulation may allow the device 100 to maintain a chilled beverage below ambient temperature for extended periods of time, which is useful for using the pressurized brewing, gas-infusion, and dispensing device 100 as a serving device.

The gas reservoir 102 may be configured to supply gas at above-ambient pressure within the vessel 101. The gas reservoir 102 may contain, for example, nitrogen or nitrous oxide. As another example, a mixture of carbon dioxide and nitrogen may be used in embodiments. In other embodiments, other gasses may be used.

The pressure regulation device 103 is configured to maintain a desired pressure inside the vessel 101. As illustrated in FIG. 1, the desired pressure may be controlled by the user via a control dial 112. In an integrated system—such as the embodiment illustrated in FIG. 1, where the brewing, gas-infusion, storing, and dispensing functions all reside within a single, user-portable device—the pressure regulation device 103 may be variable since the desired internal pressure of the vessel 101 for fast infusion of gas may be different than the desired internal pressure for long-term storage of gas-infused liquid within the vessel 101 or dispensing gas-infused liquid from the vessel 101. In embodiments, such as the embodiment illustrated in FIG. 1, the pressure regulation device 103 may also be configured to be a cap 113 for the vessel 101 or the pressure regulation device 103 may be integrated into the cap 113. The cap 113 may be, for example, threaded to the vessel 101, such as at a neck 114 of the vessel 101.

The primary filter 104 is configured to hold solid brewing media. The solid brewing media may be, for example, coffee, tea or other solid material intended to infuse into liquid in the vessel 101. The liquid may be or include, for example, water. The primary filter 104 is further configured to fit within the vessel 101 and to be removable from the vessel 101, such as through the neck 114 of the vessel 101. In this context, "removable" means that the primary filter 104 and the vessel 101 can be separated and moved away from each other without causing permanent damage to either component. In embodiments, there may be more than one primary filter 104, each containing solid brewing media. The primary filter 104 may include a string 130, lanyard, or similar element to act as a drawstring to close the primary filter 104 or as a handle to assist with removal of the primary filter 104 from the vessel 101, or both.

The first secondary filter 105, or lower pass-through filter, is configured to protect downstream plumbing, such as a lower pass-through 115 to the visual level gauge 107, from the solid brewing media in the case of a failure of the primary filter 104 or other debris within the vessel 101. The first secondary filter 105 may also be configured to promote gas infusion during the agitation step in the cold-brewing process, as further explained below. The second secondary filter 106, or upper pass-through filter, is configured to protect downstream plumbing, such as an upper pass-through 116 to the visual level gauge 107, from solid brewing media or other debris within the vessel 101.

The visual level gauge 107 is configured to provide a visual indication to the user of the level of a liquid-gas interface 117 within the vessel 101. As illustrated in FIG. 1, the pressure indicator 108, or pressure gauge, is configured to indicate a current pressure within the vessel 101.

Figure 2:
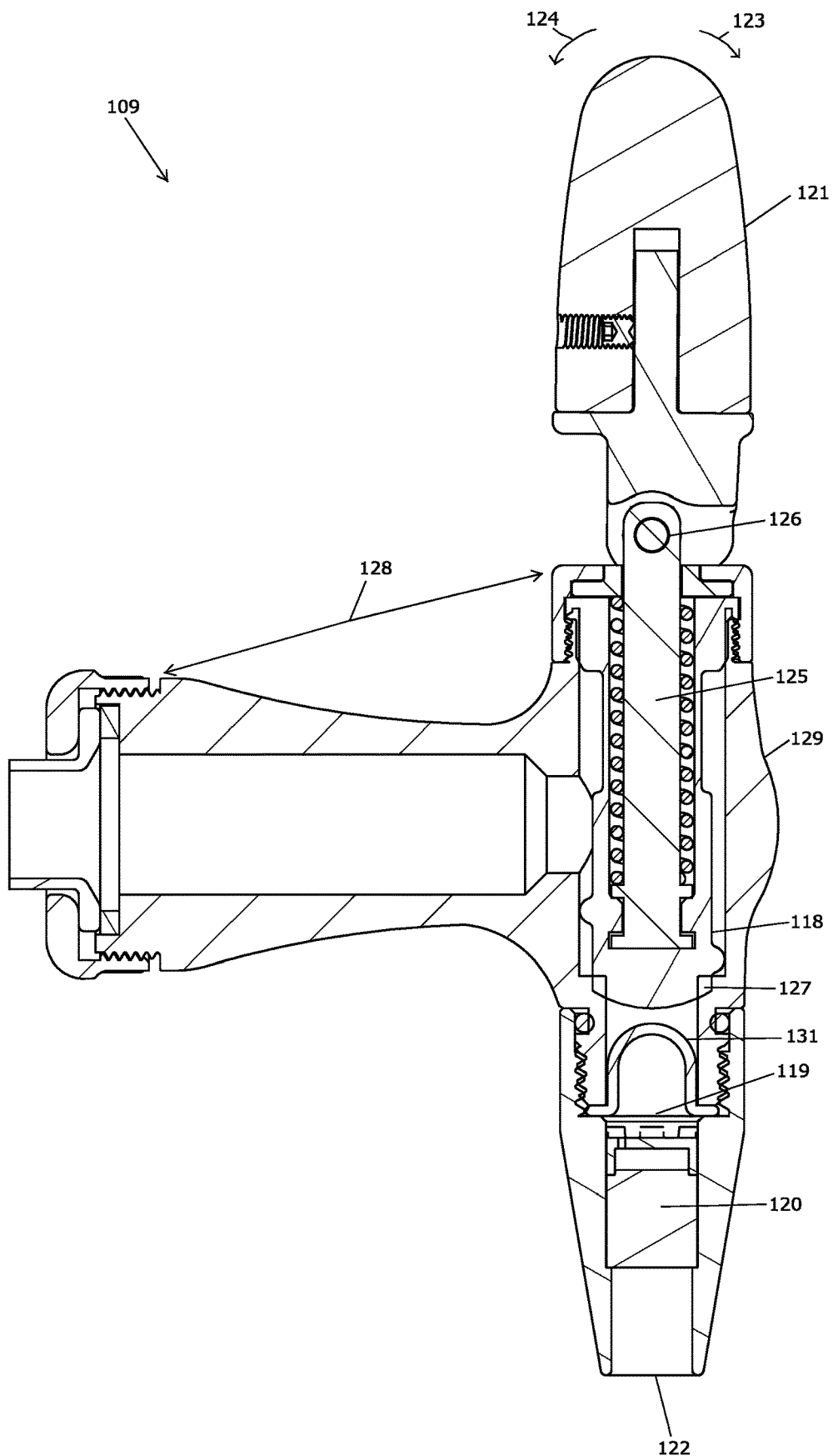
FIG. 2 is a detailed view of a tap assembly of the device illustrated in FIG. 1.

The tap assembly 109 may be configured to dispense the beverage from the vessel 101. FIG. 2 is a detailed view of a tap assembly 109 of the pressurized brewing, gas-infusion, and dispensing device 100 illustrated in FIG. 1. As illustrated in FIG. 2, the tap assembly 109 may include a tap valve 118, a tertiary filter 131, a restrictor 119, a flow straightener 120, an actuator handle 121, and a tap outlet 122.

The tap valve 118 is configured to control dispensing of the liquid beverage from the vessel 101 by allowing or preventing such dispensing. The flow straightener 120 is configured to recombine, slow, and straighten the two-phase, liquid-gas flow downstream of the restrictor 119. The tertiary filter 131 is configured to protect the restrictor 119 from solid brewing media or other debris.

The restrictor 119 is configured to regulate the flow of the pressurized liquid beverage from the vessel 101 and promote the gas effervescence by accelerating the flow to the turbulent flow regime. The restrictor 119 may include, for example, multiple tiny jets. The restrictor 119 may be specially configured to operate at typical operating pressures of the pressurized brewing, gas-infusion, and dispensing device 100 and with typical gasses utilized by the pressurized brewing, gas-infusion, and dispensing device 100. The typical operating pressures may be, for example, about 15-25 PSI (pounds per square inch) for infusion and about 5-15 PSI for dispensing. Those pressures may differ from typical operating pressures of a commercial gas infusion system, which tend to be greater than 40 PSI for infusion and about 15-25 PSI for dispensing. As noted above, the typical gasses may include nitrogen, nitrous oxide, or a mixture of carbon dioxide and nitrogen, as examples.

The actuator handle 121 is configured to actuate the tap valve 118. As illustrated in FIG. 2, the actuator handle 121 may be coupled to an actuator rod 125 through a pivot 126. The actuator rod 125 is configured to move the tap valve 118 toward and away from the valve seat 127, depending on the position of the actuator handle 121. The tap valve 118 may be biased closed, namely positioned against the valve seat 127.

The actuator handle 121 may be configured to be placed in three positions: an actuating position, an off position, and a locked position. FIG. 2 illustrates the actuator handle 121 in an example off position. In the off position, the tap valve 118 is against the valve seat 127, and the actuator handle 121 remains readily accessible to the user by being generally not against a vessel-side portion 128 of a tap body 129 (in contrast to the locked position described below). For example, in the off position, the actuator handle 121 may be substantially upright, such as illustrated in FIG. 1. As used in this disclosure, "substantially upright" means largely or essentially upright when the device 100 is in its typical operating position, such as the position illustrated in FIG. 1, without requiring perfect verticality.

To move the actuator handle 121 from the off position to the actuating position, the user may pivot the actuator handle 121 in a first direction 123. The first direction 123 may be substantially toward the user and away from the vessel 101. As used in this disclosure, "substantially toward" means largely or essentially in the direction of without requiring perfect directionality. This pivoting of the actuator handle 121 in the first direction 123 is generally less than about ninety degrees from the off position. In the actuating position, the tap valve 118 is unseated from the valve seat 127, allowing liquid to pass from the vessel 101, through the tap assembly 109, and out of the tap outlet 122.

To move the actuator handle 121 from the off position to the locked position, the user may pivot the actuator handle 121 in a second direction 124. The second direction 124 may be substantially away from the user and toward the vessel 101. As used in this disclosure, "substantially away from" means largely or essentially in the opposite direction without requiring perfect contra-directionality. This pivoting of the actuator handle 121 in the second direction 124 is generally at least about ninety degrees from the off position. In the locked position, the tap valve 118 is against the valve seat 127, but the actuator handle 121 is less readily accessible to the user by being generally against a vessel-side portion 128 of a tap body 129.

Accordingly, the user may pivot the actuator handle 121 in the first direction 123 to actuate the tap valve 118 and dispense the contents of the vessel 101. In addition, the user may pivot the actuator handle 121 in the second direction 124 to lock the tap valve 118 in place, thereby substantially preventing the contents of the vessel 101 from being dispensed. Because the second direction 124 is generally away from the user, this feature may be referred to as the flip-back-to-lock feature.

Another example of a flip-back-to-lock feature, using different structures and technique, is disclosed in US 2019/0389714, the published application Ser. No. 16/449,128 to Sonnichsen et al., entitled "System for Regulating Pressure within and Dispensing from a Beverage Container."

An example process for using a pressurized brewing, gas-infusion, and dispensing device 100, such as the pressurized brewing, gas-infusion, and dispensing device 100 illustrated in FIGS. 1 and 2 may be as follows.

The user may measure a desired amount of solid brewing media, fill the primary filter 104 with the solid brewing media, and close the primary filter 104 to reduce loss of solid brewing media during use. The user may then insert the filled primary filter 104 into the vessel 101, such as through the neck 114 of the vessel 101.

The user may then fill the vessel 101 with a measured amount of water, the amount of water corresponding to the amount of solid brewing media within the primary filter 104. The user may then connect the gas reservoir 102 to the pressure regulation device 103. The user may then install the cap 113 onto the vessel 101 to close and seal the vessel 101. As noted above, in embodiments the pressure regulation device 103 may be the cap 113 or may be integrated into the cap 113.

The user may then set the pressure regulation device 103 to a desired infusion pressure by, for example, adjusting the control dial 112 or the pressure gauge, or both the control dial 112 and the pressure gauge.

The user may then agitate, or shake, the vessel 101 to promote both solid brewing media and gas infusion. In the case of gas infusion, the process may be aided if the vessel 101 is turned sideways so that the liquid-gas interface 117 passes through the first secondary filter 105, the second secondary filter 106, or both. The secondary filters create high surface-area regions as the liquid contents of the vessel 101 are forced through the individual pores of the secondary filter by the agitation, thus promoting gas infusion into the liquid.

The user may next put the vessel 101 aside for a desired amount of time for the cold brewing process to reach completion, which is typically 12-24 hours. Here, cold brewing refers to the process of infusing the solid brewing media into the liquid contents of the vessel 101 to a desired concentration.

Once the cold brewing is completed, the user may move the pressure control dial 112 to an "off" position to release above-ambient pressure within the vessel 101, remove the cap 113, and then remove the primary filter 104 from within the vessel 101.

The user may then add a measured volume of water into the vessel 101 so that the liquid level reaches a desired level. For example, the user may wish to "top off" the vessel 101 to account for the volume lost by removal of the primary filter 104 from the vessel 101.

The user may then reinstall the cap 113 and adjust the control dial 112 along with the pressure gauge to set the pressure within the vessel 101 to the desired pressure for dispensing and storage.

To dispense, the user may move the actuator handle 121, which opens the tap valve 118 and allows the beverage to flow out of the vessel 101. The flow is restricted and made turbulent by the restrictor 119, and then flows through the straightener before entering, for example, the user's drinking cup.

Figure 3:
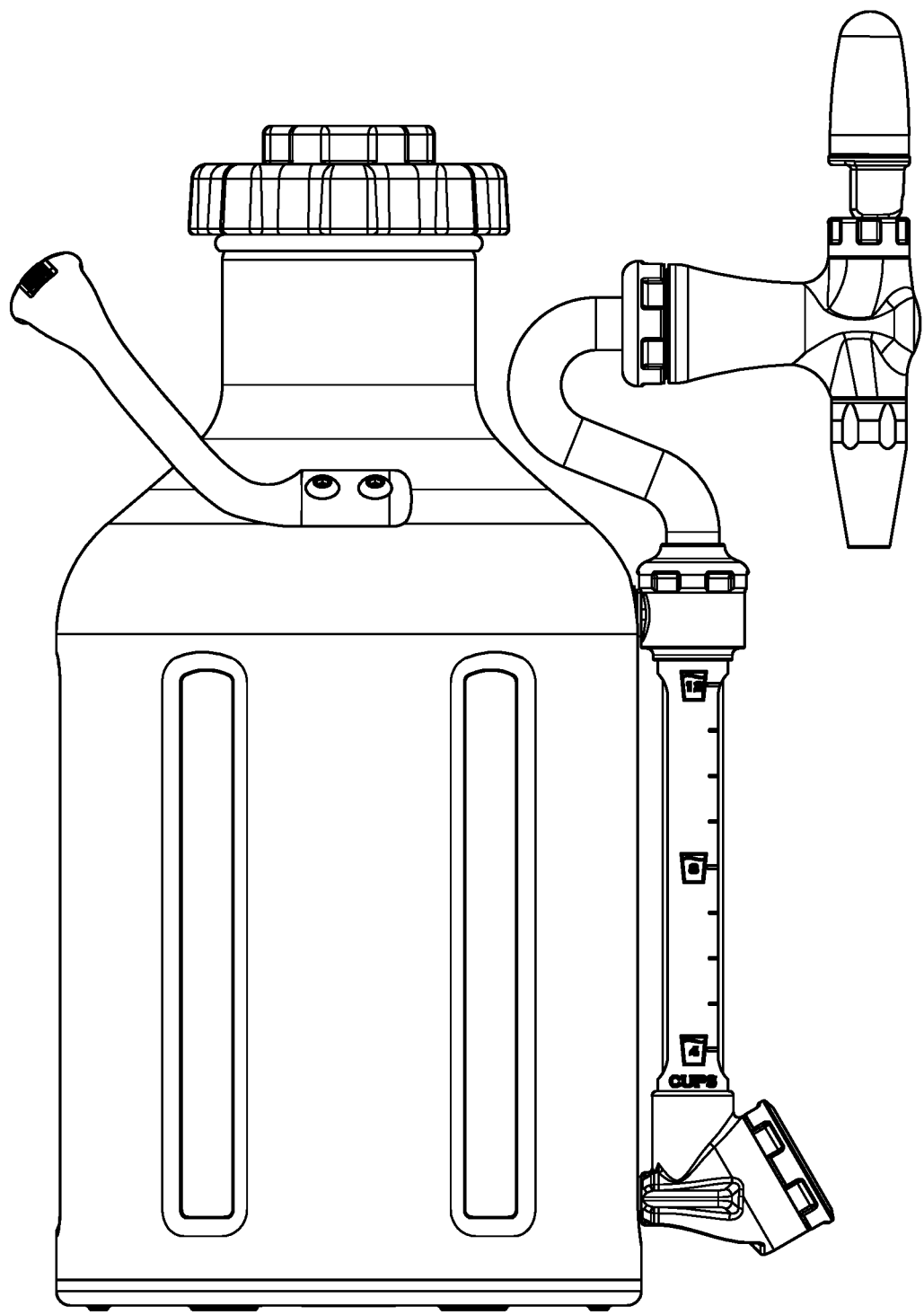
FIG. 3 is a front view of an embodiment of a pressurized brewing, gas-infusion, and dispensing device.
Figure 4:
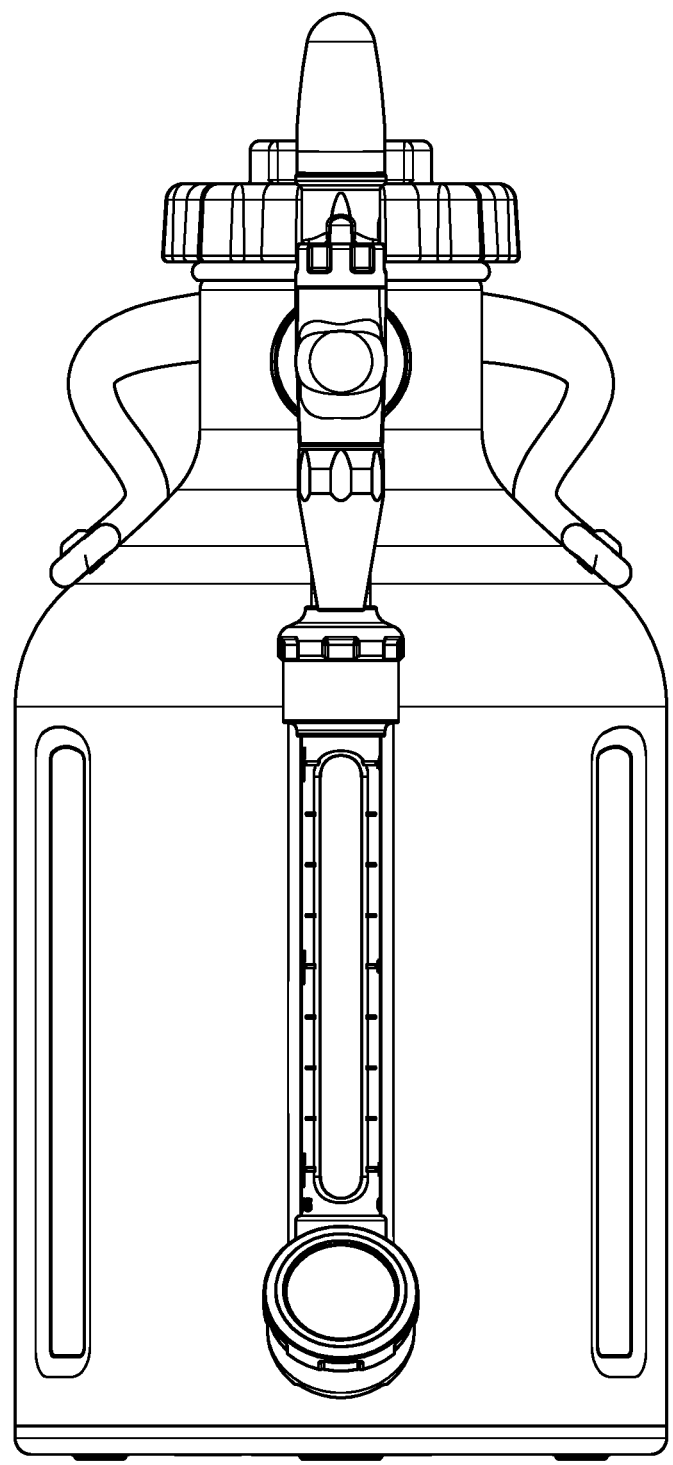
FIG. 4 is a right-side view of the pressurized brewing, gas-infusion, and dispensing device of FIG. 3.
Figure 5:
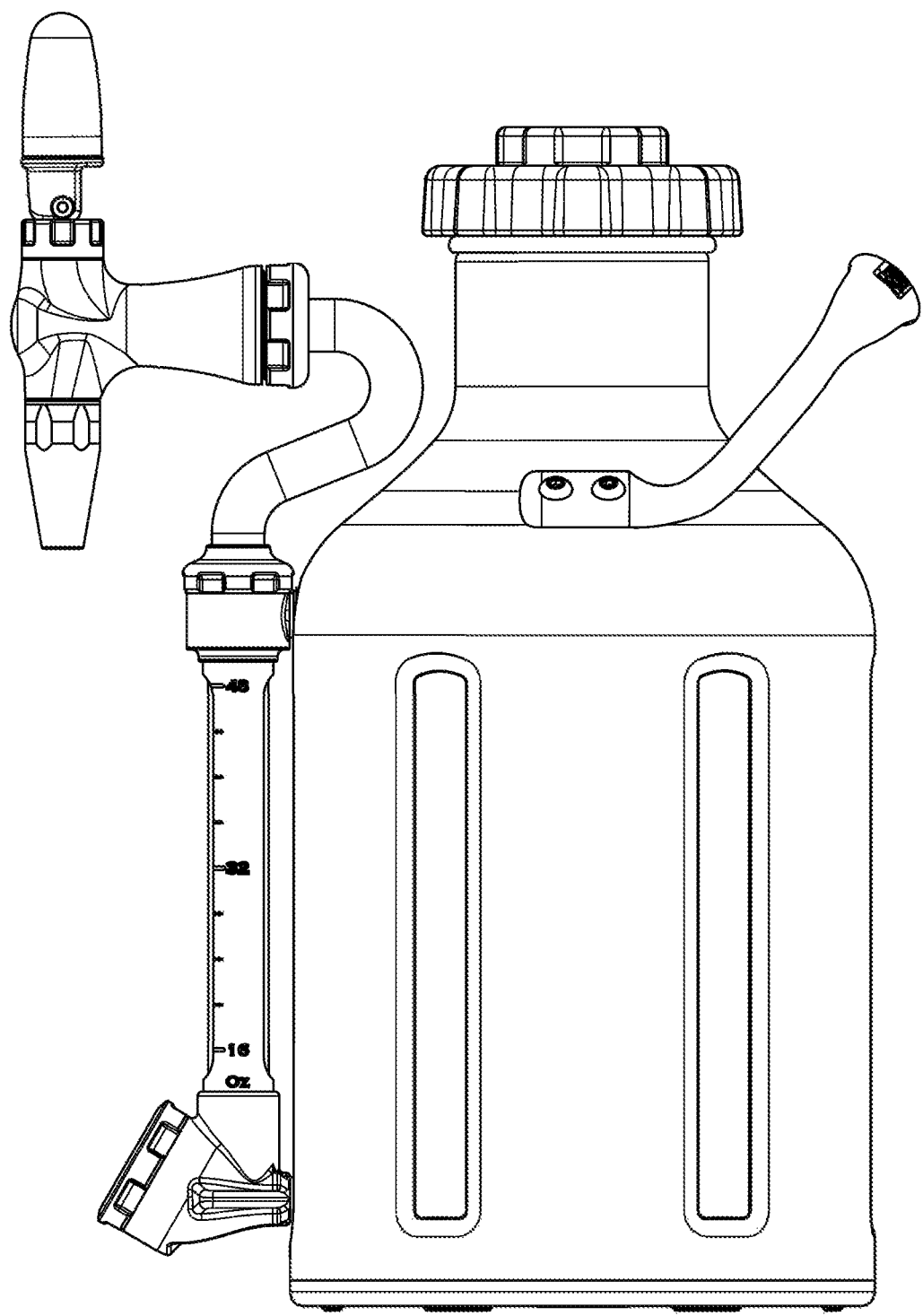
FIG. 5 is a rear view of the pressurized brewing, gas-infusion, and dispensing device of FIG. 3.
Figure 6:
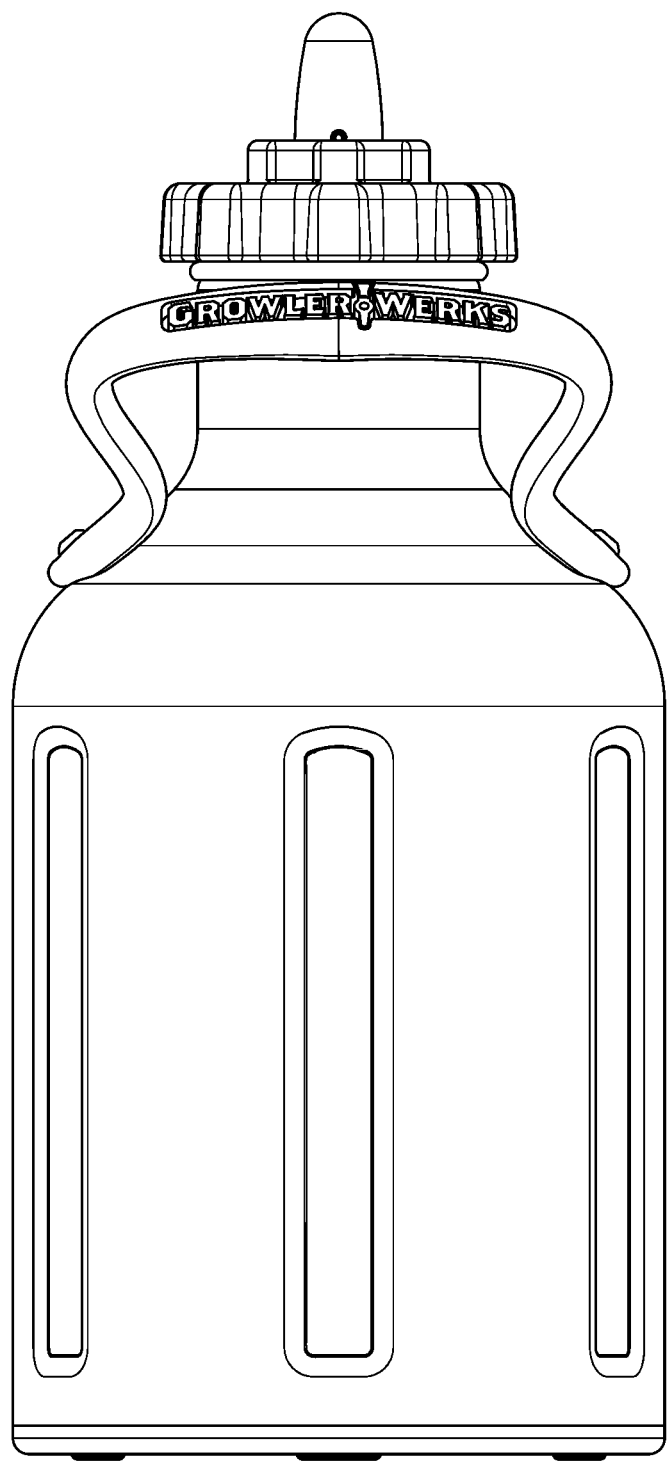
FIG. 6 is a left-side view of the pressurized brewing, gas-infusion, and dispensing device of FIG. 3.
Figure 7:
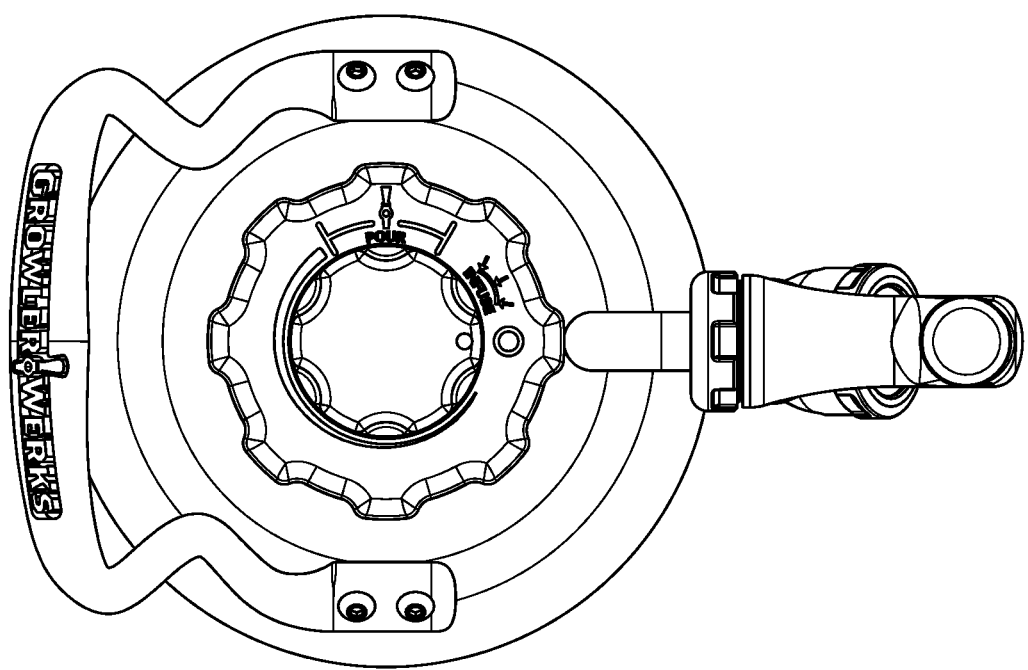
FIG. 7 is a top view of the pressurized brewing, gas-infusion, and dispensing device of FIG. 3.
Figure 8:
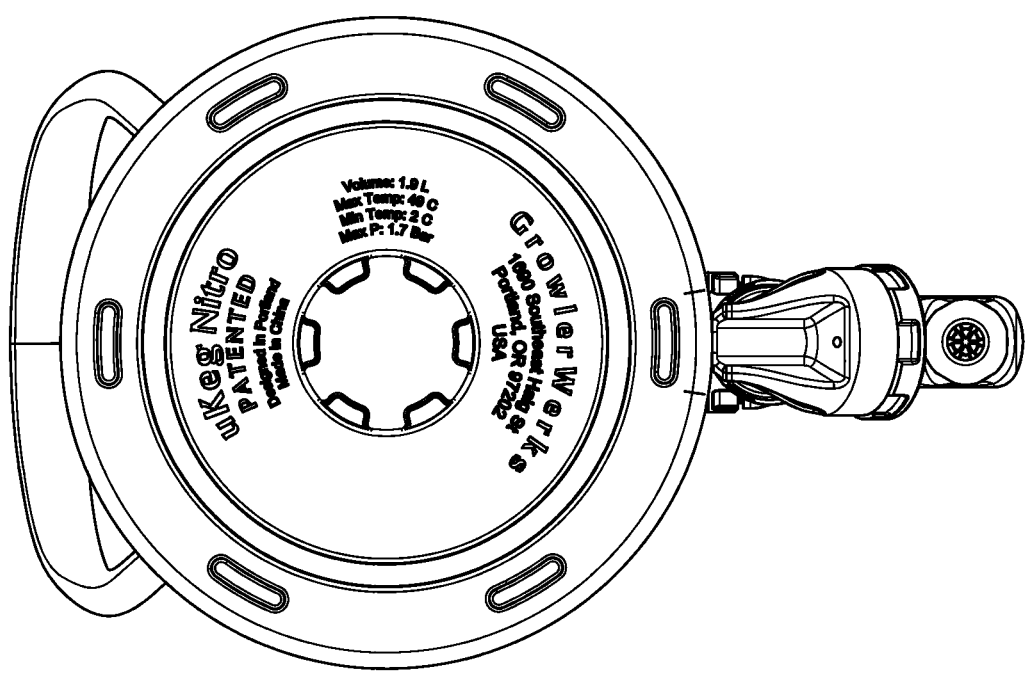
FIG. 8 is a bottom view of the pressurized brewing, gas-infusion, and dispensing device of FIG. 3.
Figure 9:
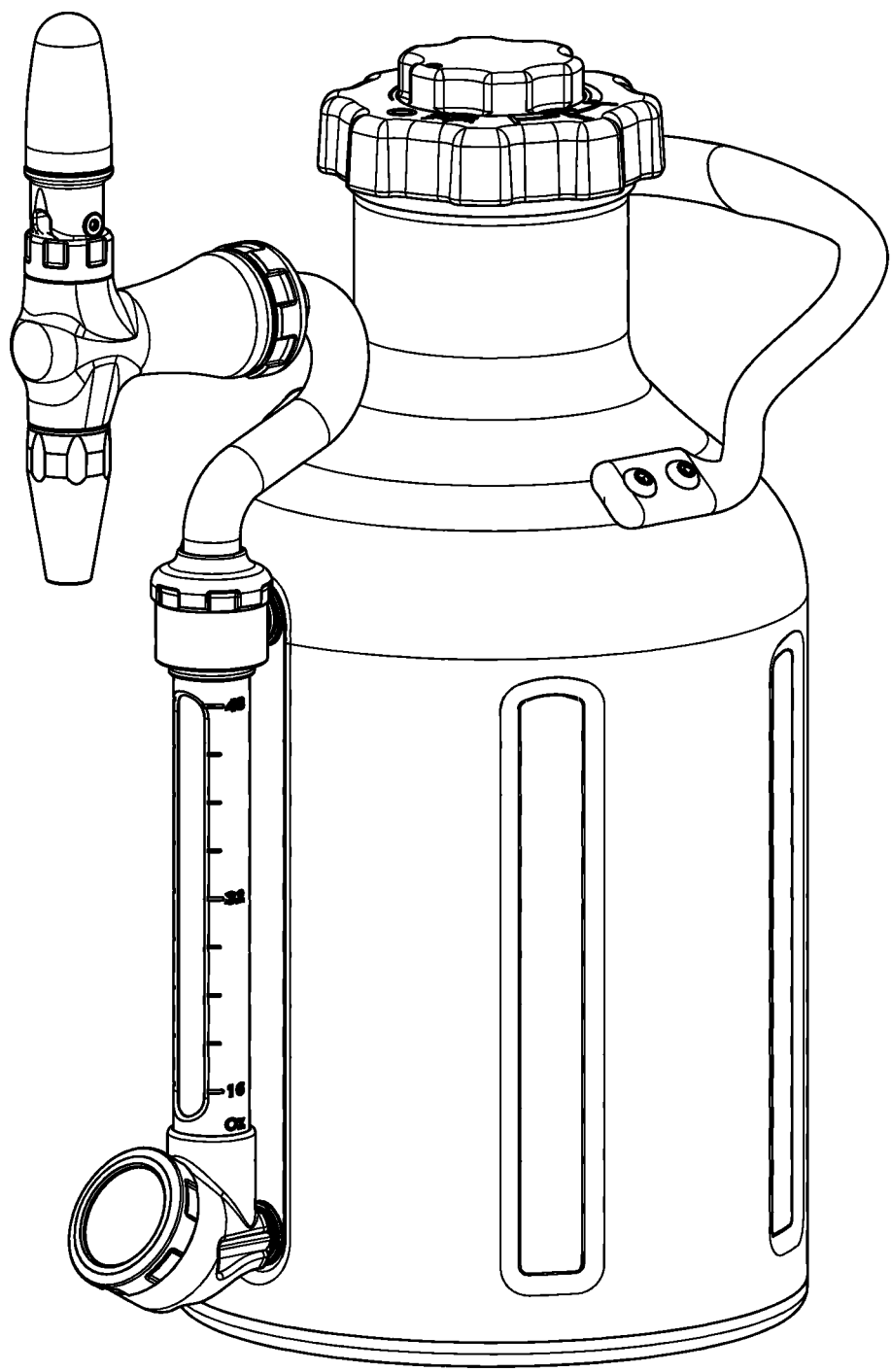
FIG. 9 is a top isometric view of the pressurized brewing, gas-infusion, and dispensing device of FIG. 3.
Figure 10:
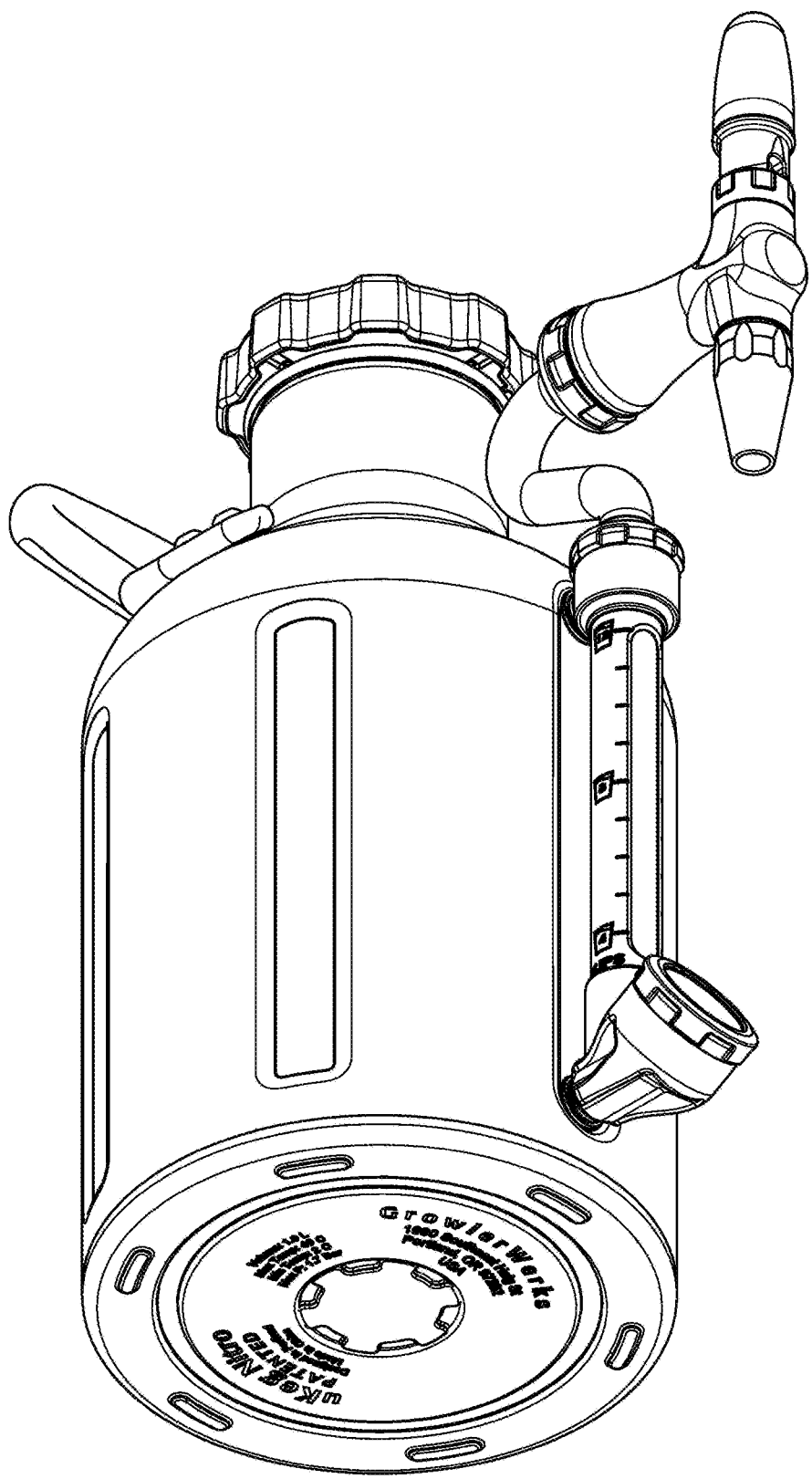
FIG. 10 is a bottom isometric view of the pressurized brewing, gas-infusion, and dispensing device of FIG. 3.

FIG. 3 is a front view of an embodiment of a pressurized brewing, gas-infusion, and dispensing device 100. FIG. 4 is a right-side view of the pressurized brewing, gas-infusion, and dispensing device 100 of FIG. 3. FIG. 5 is a rear view of the pressurized brewing, gas-infusion, and dispensing device 100 of FIG. 3. FIG. 6 is a left-side view of the pressurized brewing, gas-infusion, and dispensing device 100 of FIG. 3. FIG. 7 is a top view of the pressurized brewing, gas-infusion, and dispensing device 100 of FIG. 3. FIG. 8 is a bottom view of the pressurized brewing, gas-infusion, and dispensing device 100 of FIG. 3. FIG. 9 is a top isometric view of the pressurized brewing, gas-infusion, and dispensing device 100 of FIG. 3. FIG. 10 is a bottom isometric view of the pressurized brewing, gas-infusion, and dispensing device 100 of FIG. 3. The pressurized brewing, gas-infusion, and dispensing device 100 of FIGS. 3-10 may be, for example, the pressurized brewing, gas-infusion, and dispensing device 100 of FIG. 1.

There are several benefits of this invention over the current state of the art or commercially available equipment for making and serving gasified cold-brew beverages such as coffee. Those include cost, ease of use, portability, control of temperature, and control of the amount of dissolved gas. All of these benefits are needed by consumers who prefer cold-brew coffee as a new and exciting type of coffee product. Caffeine is known as an important compound to increase alertness and productivity. However, some people do not like hot coffee or they are bored of drinking hot coffee. Brewing coffee at a cold temperature provides a more delicate mouth feel with less astringent flavors. Thus cold-brew coffee is preferred by many people to the alternative of brewing hot coffee then lowering the temperature of the hot brewed coffee.

Currently, gasified cold-brew coffee is routinely sold with the name "nitro cold-brew coffee" by several coffee beverage brands. Such retailers offers nitro cold-brew coffee at nearly every location, and the gasified cold-brew coffee is served from commercial keg, tap, and faucet equipment. The price of a pint of "nitro cold-brew coffee" can range from $4 to $6 depending on the retailer. Some coffee beverage companies offer nitro cold-brew coffee in a canned packaged version for sales at grocery stores in the cold beverage aisles. The price of this per pint also ranges from $5 to $7.

There is a significant cost benefit and advantage for the consumer being able to make nitro cold-brew coffee at home instead of buying from coffee retailers. The cost of gourmet coffee to make 48 ounces of cold-brew coffee can be as low as $2, and the cost of a gas cartridge is $3, thus providing nitro cold-brew coffee at $1.66 per 16-ounce pint versus $4-$7. That is a savings of $2.34 (140%) to $5.34 (421%) per pint by using embodiments of the invention to make nitro cold-brew coffee at home.

Further, the cost of all of the individual components needed to build a complete system that is capable of making nitro cold-brew coffee from the currently available commercial equipment may be cost prohibitive for a consumer or catering service. A pressure regulator for high pressure gas alone may be more than $1,000. Also, the gasses that would be needed to infuse into the coffee may not be readily available to a consumer or would also be cost prohibitive.

In addition to the cost savings benefits of the embodied invention, it is also easy to use compared to the currently available alternatives. While making nitro cold-brew coffee at home clearly has cost benefits, it is substantially less than the cost of purchasing and using commercial kegging and pressurized gas equipment. The embodied invention is designed to integrate all the components needed in a way that is not currently available commercially or for an in-home device. Everything needed to make nitro cold-brew coffee is fully integrated. The storage vessel, brewing vessel, pressurized gas source, gas regulator and serving tubes and valves are combined in a unique way. Further, the use of small individual pressurized gas canisters is much simpler for the user than relying on one large tank, which is impractical for at home use as the tank may not even fit inside of a consumer's home and may create safety concerns. There are no connections that need to be made, and the brewing, serving and adding pressurized dissolved gas all happens in one vessel. The regulator is as easy to operate as a common household appliance such as a reusable whipped cream dispenser or soda water maker.

In addition to low cost and ease of use, another benefit of a nitro cold-brew coffee maker is portability. Because embodiments of the invention contain all the components used to add gas to liquids in one device, it is also able to be easily transported short or long distances. Some embodiments include a carrying handle for this purpose. For example, if a user wants to remove the apparatus from their refrigerator into a dining room, entry way, or backyard seating area where a meal will take place, the apparatus can be moved there and serve nitro cold-brew coffee in that location. This would be advantageous because the beverage can be served on demand as consumers want to drink it. The alternative is consumers would have to walk back to the location of where the commercial equipment is stored—most likely the refrigerator or garage, if they wanted to serve the coffee, then transport the beverage with dissolved gas to the location where it would be consumed. Exposure to oxygen and atmospheric pressure can degrade the beverage during transport and exposure, and could also risk spillage, and introduces an undesirable inconvenience. However, the portability of the apparatus extends far beyond a common household. The apparatus could be transported to an office or workplace, a vacation such as trip to stay at a vacation house or hotel, or accompany a consumer on a camping trip outdoors, thus accentuating the same benefits of being able to transport nitro cold-brew coffee while preserving the quality of the beverage taste and gas content and temperature. Another benefit of portability is catering use. The apparatus containing nitro cold-brew coffee could be placed on a beverage bar alongside hot coffee, tea, and other beverages commonly served by catering food and beverage services. Embodiments of the invention would allow nitro cold-brew coffee to be served at these events and included in these services as a benefit to consumers and the catering service's customers.

One aspect of cold-brew coffee is that is must be served at a cold temperature. Guidelines recommend temperatures in the range of standard refrigerated beverages and cold coffee. Embodiments of the invention include a vessel that may be vacuum insulated to prevent thermal heat transfer from the ambient surroundings into the coffee that would result in an increase of temperature over time if the cold brew cannot be stored in the refrigerator. An increase of temperature is very undesirable for cold-brew coffee because it degrades the attractiveness of the beverage being consumed at a cold temperature. Increasing temperature also reduces the amount of dissolved gas that can be retained in the coffee. Increased temperature increases the vapor pressure of the dissolved gas and thus causes it to vaporize and be released from the liquid solution, thus leaving behind a flat beverage. The remaining cold-brew coffee after the dissolved gas leaves is simply regular flat cold-brew coffee.

Embodiments of the invention include a gas regulator that creates the ability of the user to control the amount of dissolved gas that will be added to cold-brew coffee. Being able to regulate the amount of dissolved gas in nitro cold-brew coffee is advantageous because the regulation allows a consumer to produce a beverage that is optimal for consumers. The amount of the dissolved gas creates the desired mouth feel and also crema or foam layer on top of the beverage after pouring. Too much gas is undesirable because that could create an overly effervescent mouth feel. Too much dissolved gas could also create too much foam when pouring and serving the cold-brew coffee. An optimal amount of foam layer after pouring is around one inch. Likewise, too little dissolved gas would not adequately gasify the cold-brew coffee, so that consumers would distinguish it as nitro cold-brew coffee that is commercially available and the associated benefits. If not enough gas is dissolved the beverage would simply be flat, cold-brew coffee.

EXAMPLES

Illustrative examples of the disclosed technologies are provided below. An embodiment of the technologies may include one or more, and any combination of, the examples described below.

Example 1 An integrated device for brewing, gas infusing, and dispensing a beverage, the integrated device comprising: a vessel configured to contain a beverage; a gas reservoir configured to supply pressurized gas within the vessel; a pressure regulation device configured to maintain an infusing pressure within the vessel, the infusing pressure being above ambient pressure, the pressure regulation device further configured to maintain a dispensing pressure within the vessel, the dispensing pressure being above ambient pressure; a primary filter configured to hold solid brewing media, the primary filter further configured to fit inside the vessel and to be removable from the vessel; and a tap assembly configured to dispense the beverage from the vessel.

Example 2 includes the integrated device of Example 1, in which the pressure regulation device is integrated into a cap configured to close the vessel.

Example 3 includes the integrated device of any of Examples 1-2, in which the vessel is double-walled.

Example 4 includes the integrated device of Example 3, in which the double-walled vessel is thermally insulated.

Example 5 includes the integrated device of any of Examples 1-4, further comprising a first secondary filter configured to protect a dispensing outlet of the vessel from debris within the vessel.

Example 6 includes the integrated device of Example 5, the dispensing outlet of the vessel further comprising a visual level gauge configured to provide a visual indication of a level of a liquid-gas interface within the vessel, the first secondary filter configured to protect from solid brewing media a first fluid passageway from the vessel to the visual level gauge.

Example 7 includes the integrated device of Example 6, further comprising a second secondary filter configured to protect from solid brewing media a second fluid passageway from the vessel to the visual level gauge.

Example 8 includes the integrated device of any of Examples 1-7, the tap assembly further comprising: a tap valve configured to control dispensing from the vessel by allowing or preventing dispensing; a restrictor configured to accelerate a flow of beverage through the tap assembly to a turbulent flow; and a flow straightener downstream of the restrictor and configured to recombine, slow, and straighten the flow of beverage.

Example 9 includes the integrated device of Example 8, the tap assembly further comprising a tertiary filter upstream of the restrictor and configured to protect the restrictor from solid brewing media.

Example 10 includes a method of preparing cold-brewing a beverage while simultaneously infusing the beverage with gas, the method comprising: inserting a primary filter enclosing an amount of solid brewing media into a beverage vessel; adding to the beverage vessel an amount of water, the amount of water corresponding to the amount of solid brewing media within the primary filter; closing and sealing the beverage vessel with a pressure regulation device; adjusting the pressure regulation device to an infusing pressure, the infusing pressure being above ambient pressure; and resting the beverage vessel for a cold-brewing period.

Example 11 includes the method of Example 10, further comprising: adjusting the pressure regulation device to release the infusing pressure from the beverage vessel after the resting the beverage vessel for the cold-brewing period; removing the pressure regulation device to open to beverage vessel; removing the primary filter from the beverage vessel; reinstalling the pressure regulation device to again close and seal the beverage vessel; and adjusting the pressure regulation device to a dispensing pressure, the dispensing pressure being above ambient pressure.

Example 12 includes the method of any of Examples 10-11, further comprising, after the adjusting the pressure regulation device to the infusing pressure, agitating the beverage vessel.

Example 13 includes the method of any of Examples 10-11, further comprising, after the adjusting the pressure regulation device to the infusing pressure: rotating the beverage vessel until a secondary filter within the beverage vessel breaks a liquid-gas interface within the beverage vessel; and agitating the beverage vessel when the secondary filter breaks the liquid-gas interface.

Example 14 includes a method of using an actuator handle for a beverage dispenser, the method comprising: positioning the actuator handle in an off position to position a fluid valve against a valve seat in an outlet path of the beverage dispenser to substantially block an outlet path of the beverage dispenser, the actuator handle in the off position being generally not against a vessel-side portion of a tap body of the beverage dispenser; moving the actuator handle from the off position to an actuating position by pivoting the actuator handle in a first direction to unseat the fluid valve from the valve seat, allowing beverage to flow through the outlet path; and moving the actuator handle from the off position to a locked position by pivoting the actuator handle in a second direction to maintain the fluid valve against the valve seat, the actuator handle in the locked position being generally against the vessel-side portion of the tap body of the beverage dispenser.

Example 15 includes the method of Example 14, the first direction being substantially away from the vessel and the second direction being substantially toward from the vessel.

Example 16 includes the method of any of Examples 14-15, in which the positioning the actuator handle in the off position comprises positioning the actuator handle in an upright position.

The previously described versions of the disclosed subject matter have many advantages that were either described or would be apparent to a person of ordinary skill. Even so, all of these advantages or features are not required in all versions of the disclosed apparatus, systems, or methods.

Additionally, this written description makes reference to particular features. It is to be understood that the disclosure in this specification includes all possible combinations of those particular features. For example, where a particular feature is disclosed in the context of a particular aspect or embodiment, that feature can also be used, to the extent possible, in the context of other aspects and embodiments.

Also, when reference is made in this application to a method having two or more defined steps or operations, the defined steps or operations can be carried out in any order or simultaneously, unless the context excludes those possibilities.

Furthermore, the term "comprises" and its grammatical equivalents are used in this application to mean that other components, features, steps, processes, operations, etc. are optionally present. For example, an article "comprising" or "which comprises" components A, B, and C can contain only components A, B, and C, or it can contain components A, B, and C along with one or more other components.

Also, directional words such as "upright," "vertical," "horizontal," "right," and "left" are used for convenience and in reference to the views provided in figures. But the device may have a number of orientations in actual use. Thus, a feature that is upright, vertical, horizontal, to the right, or to the left in the figures may not have that same orientation or direction in actual use if, for example, the device is tilted compared to the orientation illustrated in FIG. 1.

Although specific embodiments have been illustrated and described for purposes of illustration, it will be understood that various modifications may be made without departing from the spirit and scope of the disclosure. Accordingly, the invention should not be limited except as by the appended claims.

We claim:

1. An integrated device for brewing, gas infusing, and dispensing a beverage, the integrated device comprising:
    a vessel configured to contain a beverage;
    a gas reservoir configured to supply pressurized gas within the vessel;
    a pressure regulation device configured to maintain an infusing pressure within the vessel, the infusing pressure being above ambient pressure, the pressure regulation device further configured to maintain a dispensing pressure within the vessel, the dispensing pressure being above ambient pressure;
    a primary filter configured to hold solid brewing media, the primary filter further configured to fit inside the vessel and to be removable from the vessel;
    a first secondary filter configured to protect a dispensing outlet of the vessel from solid brewing media within the vessel, the dispensing outlet of the vessel further comprising a visual level gauge configured to provide a visual indication of a level of a liquid-gas interface within the vessel, the first secondary filter configured to protect from solid brewing media a first fluid passageway from the vessel to the visual level gauge;
    a second secondary filter configured to protect from solid brewing media a second fluid passageway from the vessel to the visual level gauge; and
    a tap assembly configured to dispense the beverage from the vessel.

2. The integrated device of claim 1, in which the pressure regulation device is integrated into a cap configured to close the vessel.

3. The integrated device of claim 1, in which the vessel is double-walled.

4. The integrated device of claim 3, in which the double-walled vessel is thermally insulated.

5. The integrated device of claim 1, the tap assembly further comprising:
    a tap valve configured to control dispensing from the vessel by allowing or preventing dispensing;
    a restrictor configured to accelerate a flow of beverage through the tap assembly to a turbulent flow; and
    a flow straightener downstream of the restrictor and configured to recombine, slow, and straighten the flow of beverage.

6. The integrated device of claim 5, the tap assembly further comprising a tertiary filter upstream of the restrictor and configured to protect the restrictor from solid brewing media.

7. A method of preparing cold-brewing a beverage while simultaneously infusing the beverage with gas, the method comprising:
    inserting a primary filter enclosing an amount of solid brewing media into a beverage vessel;
    adding to the beverage vessel an amount of water, the amount of water corresponding to the amount of solid brewing media within the primary filter;
    closing and sealing the beverage vessel with a pressure regulation device;
    adjusting the pressure regulation device to an infusing pressure, the infusing pressure being above ambient pressure; and then
    rotating the beverage vessel until a secondary filter within the beverage vessel breaks a liquid-gas interface within the beverage vessel;
    agitating the beverage vessel when the secondary filter breaks the liquid-gas interface; and
    resting the beverage vessel for a cold-brewing period.

8. The method of claim 7, further comprising:
    adjusting the pressure regulation device to release the infusing pressure from the beverage vessel after the resting the beverage vessel for the cold-brewing period;
    removing the pressure regulation device to open to beverage vessel;
    removing the primary filter from the beverage vessel;
    reinstalling the pressure regulation device to again close and seal the beverage vessel; and
    adjusting the pressure regulation device to a dispensing pressure, the dispensing pressure being above ambient pressure.

9. A method of using an actuator handle for a beverage dispenser, the method comprising:
    positioning the actuator handle in an off position to position a fluid valve against a valve seat in an outlet path of the beverage dispenser to substantially block an outlet path of the beverage dispenser, the actuator handle in the off position being generally not against a vessel-side portion of a tap body of the beverage dispenser;
    moving the actuator handle from the off position to an actuating position by pivoting the actuator handle in a first direction to unseat the fluid valve from the valve seat, allowing beverage to flow through the outlet path, the first direction being substantially away from the vessel and the second direction being substantially toward from the vessel; and
    moving the actuator handle from the off position to a locked position by pivoting the actuator handle in a second direction to maintain the fluid valve against the valve seat, the actuator handle in the locked position being generally against the vessel-side portion of the tap body of the beverage dispenser.

10. The method of claim 9, in which the positioning the actuator handle in the off position comprises positioning the actuator handle in an upright position.

11. The integrated device of claim 1, the primary filter including a lanyard configured to assist with removal of the primary filter from the vessel.

* * * * *